No. 813,377. PATENTED FEB. 20, 1906.
B. J. H. GUICE.
GARDEN RAKE AND CULTIVATOR.
APPLICATION FILED APR. 10, 1905.
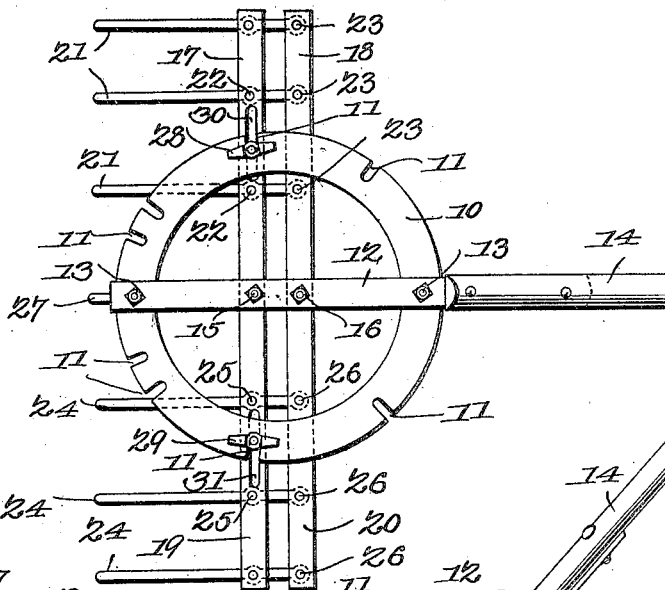
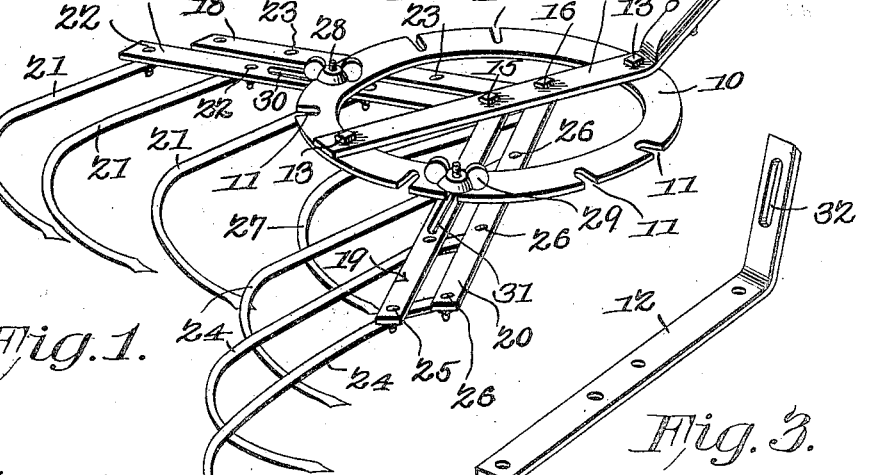
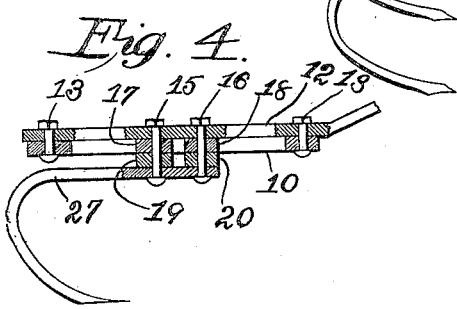
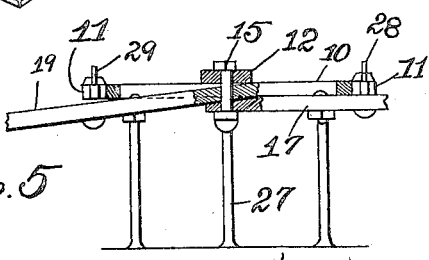
Benjamin J. H. Guice,
Inventor
Witnesses
by C. A. Snow & Co.
Attorneys

UNITED STATES PATENT OFFICE.

BENJAMIN J. H. GUICE, OF GRAPELAND, TEXAS.

GARDEN RAKE AND CULTIVATOR.

No. 813,377.  Specification of Letters Patent.  Patented Feb. 20, 1906.

Application filed April 10, 1905. Serial No. 254,828.

*To all whom it may concern:*

Be it known that I, BENJAMIN J. H. GUICE, a citizen of the United States, residing at Grapeland, in the county of Houston and State of Texas, have invented a new and useful Garden Rake and Cultivator, of which the following is a specification.

This invention relates to improvements in garden cultivators or rakes, and has for its object to provide a simply-constructed device of this character which may be adjusted to cause the teeth to assume various relative positions and be spaced at various distances apart to readily adapt the implement to the various conditions of the growing plants.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

In the drawings thus employed, Figure 1 is a perspective view of the improved implement. Fig. 2 is a plan view of the same. Fig. 3 is a perspective view of a modified form of the supporting-bar. Fig. 4 is a sectional view longitudinally of the device; and Fig. 5 is a sectional view transversely of the device, illustrating the construction more fully.

The improved implement comprises a supporting-frame 10, annular in shape and provided with a plurality of outwardly-opening radially-disposed recesses 11 in its rim and with a bar 12 connected transversely thereof, as by bolts 13, the bar inclining upwardly away from the frame for receiving the propelling-handle 14.

Pivoted at 15 16 to the bar 12 are rake-head members 17 18 and 19 20, disposed in pairs and spaced apart, so that one pair of the head members extend away from the coupling-bar 12 at each side. The head members 17 18 are provided with rake-teeth 21, pivoted, respectively, to the head members, as at 22 23, and the head members 19 20 are provided with rake-teeth 24, pivoted thereto, as at 25 26, while a single central tooth 27 is pivoted to the bolts 15 16, by which the head members are secured to the bar 12. The pivot-bolts 15 16 are spaced at equal distances from the center of the frame 10, the inner ends of the bars 17 19 overlapping beneath the central bar 12 and held by the same pivot-bolt 15 and the bars 18 and 20 overlapping beneath the central bar 12 and both held by the same pivot-bolt 16. The central tooth member 27 being also connected to the pivot-bolts 15 16 forms a coupling or stay to the tooth-bars in addition to its service as a tooth. The tooth members 21 24 27 are formed from resilient rods curving rearwardly and downwardly and then forwardly and terminate rearwardly of their pivotal points, as shown, so that the points of the teeth engage the ground rearwardly of the tooth-bars. Hence in using the implement the weight of the frame 10, bar 12, and head members 17, 18, 19, and 20 bear downwardly and forwardly and materially assist the action. By this arrangement the rake-head bars are free to swing upon the pivots 15 16, and because the rake-teeth are pivoted thereto the latter move with the rake-head members and retain their parallel relations at all points of the adjustment, as will be obvious. Thus the rake-head members may be adjusted at right angles to the handle member 14, as in Fig. 2, or at a rearwardly-extending angle, as in Fig. 1, or at any desired intermediate angle, as will be obvious, within the range of the recesses 11.

The bars 17 and 19 are provided, respectively, with longitudinal slots 30 31, in which clamp-bolts 28 29 operate, the bolts for entering the radial recesses 11 in the member 10, and thus provide a simple and effectual means for adjusting the tooth-head bars. By this means the adjustments may be quickly accomplished by merely loosening the wing-nuts of the clamp-bolts and moving the latter outwardly in the slots 30 31 until they are free of the recesses 11. The pivots 15 16 being disposed eccentrically of the circular member 10, the tooth-bars are constantly changing their position relative to the circular member; hence the necessity for the slots 30 31 being of greater length to provide for the increased range of movement caused by the eccentric arrangement of the bars.

The handle member 14 may be of any desired form or size, or, if desired, the device may be attached to a cultivator-frame of approved construction having bearing-wheels or similar supporting members, and when thus employed the member 12 will preferably be provided with a longitudinal slot 32 in one end, as shown in Fig. 3, to provide for attachment to the supporting members.

By this simple arrangement a rake or cultivator of any required form may be quickly and easily provided to adapt the implement to all the various conditions or sizes of the plants and the condition or quality of the growth to be destroyed and will thus materially expedite the work of the gardener and correspondingly reduce the labor and expense.

The parts are simple in construction, can be inexpensively manufactured, and of any required size or materials or combinations of materials.

Having thus described the invention, what is claimed is—

1. In an implement of the class described, an annular supporting-frame, a draft-bar connected transversely of said frame, tooth-bars arranged in pairs and extending at the inner ends beneath said draft-bar, a central rake-tooth extending beneath the inner ends of said tooth-bars, pivot-bolts extending through said draft-bar the tooth-bars and the central tooth and movably coupling the same, rake-teeth spaced apart and pivoted to said tooth-bars, and means for adjustably coupling said tooth-bars to said annular frame.

2. In an implement of the class described, an annular supporting-frame having spaced marginal recesses, a draft-bar connected transversely of said frame, tooth-bars arranged in pairs and extending at the inner ends beneath said draft-bar and provided with longitudinal slots, pivot-bolts extending through said draft-bar and tooth-bars and movably coupling the same, rake-teeth spaced apart and pivoted to said tooth-bars, and clamp-bolts disposed in said longitudinal slots and adapted for detachable engagement with said marginal recesses.

In testimony that I claim the foregoing as my own I have hereto affixed my signature in the presence of two witnesses.

BENJAMIN his X mark J. H. GUICE.

Witnesses:
W. G. DARSEY,
J. T. DARSEY.